United States Patent
Felsted et al.

(10) Patent No.: US 11,281,682 B1
(45) Date of Patent: Mar. 22, 2022

(54) COMBINING DATA SOURCES FOR TYPE DOWN SEARCH RESULTS

(71) Applicant: Optum, Inc., Minnetonka, MN (US)

(72) Inventors: Patrick Felsted, Salt Lake City, UT (US); Justin McKelvy, Sandy, UT (US)

(73) Assignee: Optum, Inc., Minnetonka, MN (US)

( * ) Notice: Subject to any disclaimer, the term of this patent is extended or adjusted under 35 U.S.C. 154(b) by 0 days.

(21) Appl. No.: 17/092,772

(22) Filed: Nov. 9, 2020

(51) Int. Cl.
*G06F 16/248* (2019.01)
*G06F 16/2457* (2019.01)

(52) U.S. Cl.
CPC ...... *G06F 16/24578* (2019.01); *G06F 16/248* (2019.01)

(58) Field of Classification Search
CPC .. G06F 16/2425; G06F 16/156; G06F 16/243; G06F 16/248; G06F 16/3325
See application file for complete search history.

(56) References Cited

U.S. PATENT DOCUMENTS

| | | |
|---|---|---|
| 7,836,044 B2 | 11/2010 | Kamvar et al. |
| 8,185,529 B2 | 5/2012 | Forstall et al. |
| 8,370,329 B2 | 2/2013 | Gutt et al. |
| 9,122,755 B2 | 9/2015 | Cavazos |
| 9,384,244 B1 | 7/2016 | Garg et al. |
| 9,384,298 B2 | 7/2016 | French et al. |
| 9,454,621 B2 | 9/2016 | Angel et al. |
| 9,529,919 B2 | 12/2016 | Zhang et al. |
| 9,665,615 B2 | 5/2017 | Kulkarni et al. |
| 9,697,281 B1 | 7/2017 | Palmon et al. |
| 9,940,372 B2 | 4/2018 | Zhu et al. |
| 2007/0005563 A1* | 1/2007 | Aravamudan ......... G06F 16/40 |
| 2008/0065617 A1* | 3/2008 | Burke .................. G06F 16/951 |
| 2008/0319952 A1* | 12/2008 | Carpenter ........... G06F 16/9038 |
| 2011/0191364 A1 | 8/2011 | LeBeau et al. |
| 2011/0238662 A1* | 9/2011 | Shuster ................ G06F 16/951 707/728 |
| 2013/0132357 A1* | 5/2013 | Edgar ................... G06F 16/951 707/706 |

(Continued)

OTHER PUBLICATIONS

Bates, "Google Instant Search Demo", YouTube, Retrieved Mar. 5, 2021 from: https://www.youtube.com/watch?v=Y0GcYxdUHME, Sep. 8, 2010, 1 pp.

(Continued)

*Primary Examiner* — James E Richardson
*Assistant Examiner* — Pedro J Santos
(74) *Attorney, Agent, or Firm* — Shumaker & Sieffert, P.A.

(57) ABSTRACT

In one example this disclosure describes a method that includes receiving, by a computing system, a first single character input from a user for a type down search. Responsive to the first single character input, sending, by the computing system, a plurality of asynchronous search requests to one or more data sources. Responsive to the plurality of asynchronous search requests, receiving, by the computing system, a first one or more data source search results from a first data source. Displaying, by the computing system, the one or more data source search results. Receiving, by the computing system, a second one or more data source search results from a second data source different from the first data source. And, updating, by the computing system and based on the received second one or more data source search results, the displayed one or more data source search results.

17 Claims, 6 Drawing Sheets

(56) References Cited

U.S. PATENT DOCUMENTS

| | | |
|---|---|---|
| 2016/0283580 A1 | 9/2016 | Amacker et al. |
| 2017/0046356 A1 | 2/2017 | Marantz et al. |
| 2017/0177576 A1* | 6/2017 | Cohen .............. G06F 16/24578 |
| 2017/0228471 A1 | 8/2017 | Tomkins et al. |
| 2018/0089283 A1 | 3/2018 | Indyk et al. |
| 2019/0138557 A1 | 5/2019 | Long et al. |
| 2019/0258638 A1 | 8/2019 | Kaissi et al. |

OTHER PUBLICATIONS

McGee, "Google Instant Search: The Complete User's Guide," Search Engine Land, Retrieved Apr. 17, 2020 from: https://searchengineland.com/google-instant-complete-users-guide-50136, Sep. 8, 2010, 7 pp.

Odden, "10 Resources on Google Instant & What it Means for Search Marketing," TopRank Marketing, Retrieved from https://www.toprankblog.com/2010/09/10-resources-google-instant/, Sep. 10, 2010, 15 pp.

Smarty, "10+ Interesting Instant Search Engines to Check Out," Search Engine Journal, Oct. 27, 2010, 9 pp.

"Frances Provider Mobile App," National MedTrans, Retrieved Apr. 14, 2021 from: https://nationalmedtrans.com/training/frances-provider-mobile-app/, last updated Feb. 28, 2018, 6 pp.

"Frances-Provider App," Medtrans Providers, National MedTrans, Retrieved Apr. 14, 2021 from: https://play.google.com/store/apps/details?id=com.sdi.frances_provider&hl=en_US, last updated Dec. 23, 2019, 3 pp.

"Incremental search," Wikipedia, the Free Encyclopedia, last edited on Jun. 16, 2020, Retrieved Apr. 14, 2021, from: http://web.archive.org/web/20200917150615/https://en.wikipedia.org/wiki/Incremental_search, Accessed Sep. 17, 2020, 5 pp.

* cited by examiner

COMBINING DATA SOURCES FOR TYPE DOWN SEARCH RESULTS

BACKGROUND

A search suggest drop-down list or "type down" search is a query feature used in computing to show the searcher shortcuts, while the query is typed into a text box. Before the query is complete, a drop-down list with the suggested completions appears as options to select. The suggested queries then enable the searcher to complete the required search quickly. As a form of autocompletion, the suggestion list is distinct from search history in that it attempts to be predictive even when the user is searching for the first time. Data may come from popular searches, sponsors, geographic location or other sources. These lists are used by operating systems, web browsers and various websites, particularly search engines.

The computing science of syntax and algorithms are used to form search results from a database. Content management systems and frequent searches may assist in more refined queries with methods of parameters and subroutines. Suggestions may be results for the current query or related queries by words, time and dates, categories and tags.

SUMMARY

The present disclosure describes devices, systems, and methods that relate to combining type down search results from different data sources at a computing system. The techniques relate to combining multiple and varying search results into a common search result's interface, results data from different data sources as a user enters individual characters of a search string into a search box. New or refined results are displayed as search results arrive from the different data sources. New or refined results are also displayed as the user progressively enters more characters of a search string into a search box. The collection of the data from the data sources occurs at the computing system. When the computing system receives entry of a character in a search box, the computing system sends requests to the data sources and directly receives results from the data sources. The computing system then sorts and arranges the search results as the search results arrive at the computing system from the various data sources. The computing system continues to update the presented search results as search results arrive from the various data sources. The computing system may also apply additional filtering of the search results received from the data sources based on additional characters added to the search string.

In one aspect, this disclosure describes a method that includes receiving, by a computing system, a first single character input from a user for a type down search. Responsive to the first single character input, sending, by the computing system, a plurality of asynchronous search requests to one or more data sources. Responsive to the plurality of asynchronous search requests, receiving, by the computing system, a first one or more data source search results from a first data source. Displaying, by the computing system, the one or more data source search results. Receiving, by the computing system, a second one or more data source search results from a second data source different from the first data source. And, updating, by the computing system and based on the received second one or more data source search results, the displayed one or more data source search results.

In another aspect, this disclosure describes a system that includes a computing system, configured to perform type down searches. The computing system is communicatively coupled to one or more data sources. The computing system includes processing circuitry configured to receive a first single character input from a user for a type down search. Responsive to the first single character input, send a plurality of asynchronous search requests to the one or more data sources. Responsive to the plurality of asynchronous search requests, receive a first one or more data source search results from a first data source. Display the one or more data source search results. Receive a second one or more data source search results from a second data source different from the first data source. And, update, based on the received second one or more data source search results, the displayed one or more data source search results.

In yet another aspect, this disclosure describes a non-transitory computer-readable medium including instructions that, when executed, cause one or more processors to receive a first single character input from a user for a type down search. Responsive to the first single character input, send a plurality of asynchronous search requests to the one or more data sources. Responsive to the plurality of asynchronous search requests, receive a first one or more data source search results from a first data source. Display the one or more data source search results. Receive a second one or more data source search results from a second data source different from the first data source. Update, based on the received second one or more data source search results, the displayed one or more data source search results.

DETAILED DESCRIPTION

Figure 1:
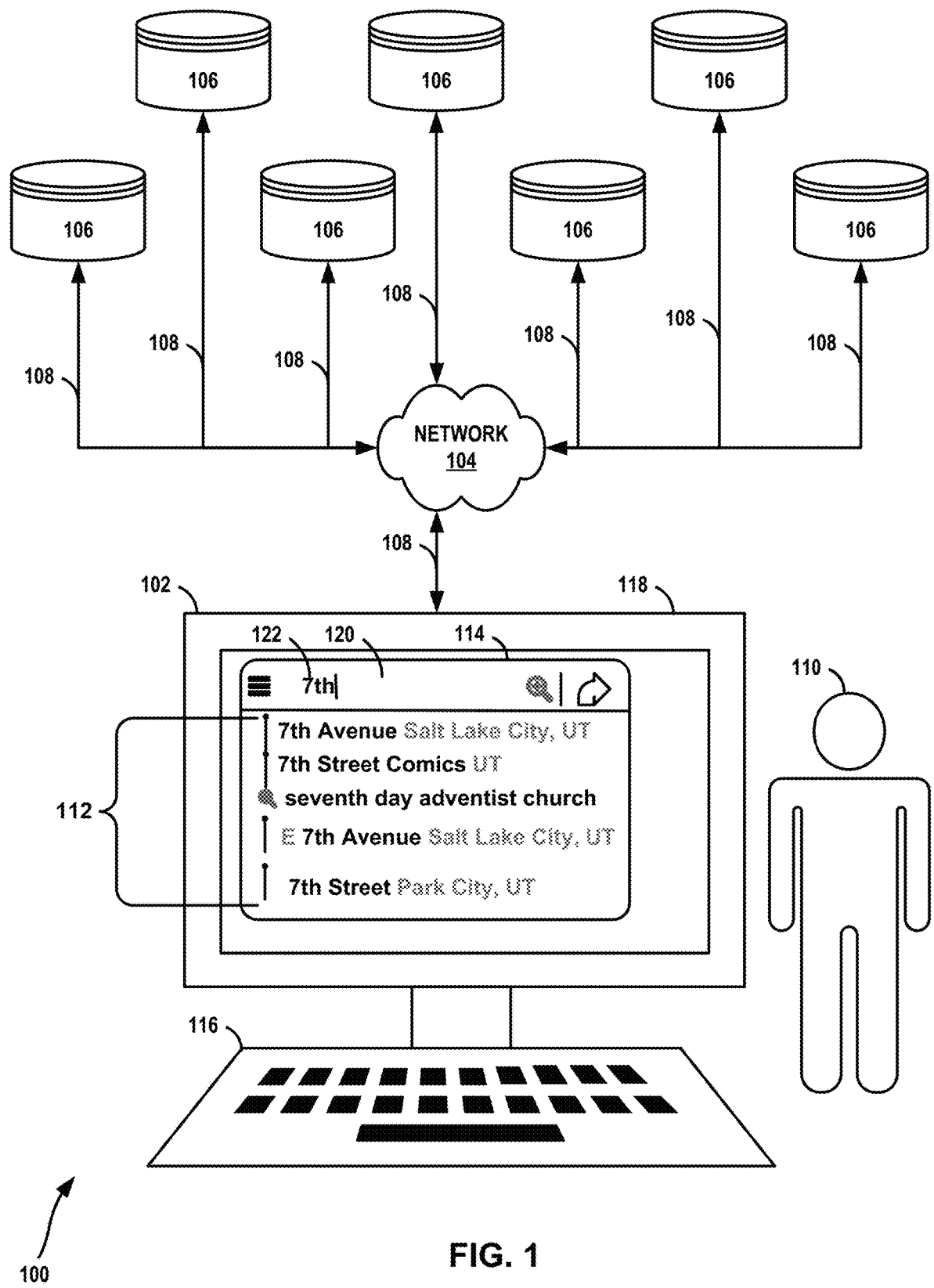
FIG. 1 is a block diagram illustrating an example system in accordance with one or more aspects of this disclosure.

The present disclosure generally relates to a system and a method for combining type down search results from different data sources. Examples of the present disclosure relate to techniques for combining search results at a computing system from multiple data sources during a "type down" search. In general, the techniques of this disclosure relate to combining, into a common search results interface, results data from different data sources as the user enters individual letters of a search string into a search box.

A "type down" search is a search in which new or refined results are displayed as the user progressively enters more characters of a search string into a search box. For example, the search box on the Google® or Bing® home pages include "type down" search boxes. Speed of presentation of search results is important for the user experience of a "type down" search.

In some examples, search result data for a "type down" search may need to be collected from several different data sources, including third-party data sources. For example, search result data may need to be collected from several third-party application program interfaces (APIs). Collecting responses from each of the data sources at a remote server and then sending the collected results to the computing system (e.g., mobile phone app, web browser, etc.) may result in significant delays in the presentation of search results. For example, such an approach may require the computing system to individually send each character of the search request to the server, then the server would have to send requests to each of the data sources, wait for each of the data sources to respond, and then send the search results back to the client. All of this may result in significant latency. This problem may be compounded by the fact that different data sources respond to search requests at different speeds.

In accordance with the techniques of this disclosure, the collection of the data from the data sources occurs at the computing system. Particularly, when the computing system receives entry of a character in a search box, the computing system sends requests to the data sources and directly receives results from the data sources. The computing system may then sort, arrange, and display the search results as the search results arrive at the computing system from the various data sources.

Thus, the computing system may continue to update the presented search results as search results arrive from the various data sources. For example, the computing system may receive search results A, B, and C from a first data source for a search string. Accordingly, in the example, the computing system may display search results A, B, and C. In this example, after the computing system has displayed search results A, B, and C, the computing system may finally receive search results D and E from a second data source for the same search string. Thus, in the example, the computing system may update the displayed search results so that the displayed search results include A, B, C, D, and E.

The computing system may also apply additional filtering of search results received from the data sources based on additional characters added to the search string. For example, if the search request entered so far is "Seve," the computing system sends out requests to the data sources for "Seve" and, in response, receives search results corresponding to "Seve". But, in the meanwhile, the user may have entered the letter "n". Accordingly, the computing system sends a request to the data sources for "Seven" and also filters the results already received for "Seve" to those search results that include "Seven." The computing system may update the presented results as search results for the search string "Seven" arrive from the data sources.

FIG. 1 is a block diagram illustrating an example system in accordance with one or more aspects of this disclosure. In the example of FIG. 1, a type down system 100 may include a computing system 102 that includes a display 118 that may present a type down interface 114 for accepting a character string 122 in a search box 120 and presenting search results 112, a network 104, one or more data sources 106 communicably coupled to network 104 through data links 108. In other examples, system 100 may include more, fewer, or different components. For instance, in some examples, one or more data sources may be connected to an internal network such as a local area network (LAN). In some examples, system 100 may include one or more additional computing systems. In other examples, system 100 may include other types of networks (e.g., cloud or LAN) coupled to varying data sources that may include internal data sources, public data sources, secure data sources or confidential data sources.

Computing system 102 may be a machine that may be instructed to carry out sequences of arithmetic or logical operations automatically via computer programming. Computing system 102 may have the ability to follow generalized sets of operations or programs. These programs may enable computing system 102 to perform an extremely wide range of tasks. Computing system 102 may include the hardware, the operating system (e.g., main software), and peripheral equipment (e.g., a keyboard 116, a display 118, a mouse, etc.) useful for operation. Additionally or alternatively, computing system 102 may also be a group of computers that are connected and work together, in particular a computer network or computer cluster.

Network 104 may connect a group of nodes (e.g., data sources 106, computing system 102) interconnected by links 108 that may be used to exchange data between the nodes. Links 108 may use a variety of technologies based on the methodologies of circuit switching, message switching, or packet switching, to pass messages and signals. For each message, multiple nodes may cooperate to pass the message from an originating node to a destination node, via multiple network hops. For this routing function each node in network 104 may be assigned a network address for identification and locating it on network 104. Additionally or alternatively, network 104 may be most any network such as computer networks, the Internet, a wide area network (WAN), a wireless local area network (WLAN), LAN, and cloud computing.

Network 104 may be used for communication between individuals and organizations. Network 104 may be connected to allow a user 110 seamless access to data sources 106 that are hosted outside of a particular provider user 110 may be connected to. For example, network 104 may be the Internet where many data sources 106 from different organizations all operate under a single address space. In another example, network 104 may be transmission control protocol/internet protocol (TCP/IP) network that may be addressed using IP addresses. TCP/IP protocols may provide the control and routing of messages across network 104. There may be many different network structures that TCP/IP may use to efficiently route messages, for example: wide area networks (WAN), metropolitan area networks (MAN), LANs, Internet area networks (IAN), campus area networks (CAN) and virtual private networks (VPN).

Data source 106 may be an organized collection of data, generally stored and accessed electronically from computer system 102. Data source 106 may be a search engine, such as Google® or Bing®, designed to carry out an Internet search in a systematic way for particular information specified in a textual web search query.

Search results 112 may generally be presented in a vertical line of results. Search results 112 may be a mix of links to web pages, images, videos, infographics, articles, research papers, and other types of files. In another example, proprietary search engines may mine data available in private databases or open directories. Data source 106 may also be any collection of related data (such as a specialized or limited access database).

Link 108 may be a communication channel that connects computing system 102 with data source 106 or two or more devices for the purpose of data transmission. Link 108 may be a dedicated physical link or a virtual circuit that uses one or more physical links or shares a physical link with other telecommunications links. Link 108 may be based on one of several types of information transmission paths such as those provided by communication satellites, terrestrial radio communications infrastructure and computer networks to connect two or more points. Examples of possible links that may be used within type down system 100 include data link, uplink, downlink, fiber optic link, and a point-to-point link.

Display 118 may be an output device for computing system 102 for presentation of information in visual or tactile form. Display 118 may be most any type of display including electroluminescent (ELD), liquid crystal display (LCD), light emitting diode (LED), etc. Additionally or alternatively, display 118 may be an audible presentation of information.

Type down interface 114 may show user 110 search results 112 that may, in some searches, result in shortcuts (e.g., web links, hyperlinks, etc.), while character string 122 are typed into a search box 120. As a character string 122 is typed in by user 110, search results 112 may be returned from data sources 106 to provide options to user 110 to select. Search results 112 may enable user 110 to complete the required search quickly.

Character string 122 may be one or more alphabetical and/or numerical characters, such as Latin letters and Arabic digits or text constructed from the collection of letters and digits. Additionally or alternatively, character string 122 may also be other symbols such as punctuation, mathematical symbols, figures, or pictures. Additionally, characters may be characters from any language, such as Chinese, Japanese, Arabic, etc., or any known written communication including shorthand, communication symbols, emojis, etc.

Search box 120 may also be referred to as a search field or a search bar and may be a graphical control element used in computer programs, such as file managers or web browsers, and on web sites. Search box 120 may be a single-line text box or search icon (e.g., transform into a search box on click activity) with the dedicated function of accepting user input to be searched for from data sources 106. Search box 120 may allow user 110 to enter character string 122 that may be submitted to a search engine server-side script, where an index database may be queried for entries that contain one or more of character string 122. Search box 120 may be accompanied by a search button (e.g., a magnifying glass symbol) to submit the search. The search button may be omitted as user 110 may press the enter key to submit the search. In examples of the present description the search may be sent automatically after each character (e.g., "7", "t", and "h") of character string 122 is typed into search box 120. User 110 may be continuously presented with real-time search results after each character is typed in. Additionally or alternatively, as each search result response returns from data source 106, search results 112 may be updated.

Search results 112 may be the results displayed by computing system 102 in response to a character or character string 122 entered into search box 120 by user 110. Search results 112 may be returned by data sources 106 in response to a character, combination of characters or a keyword query. Search results 112 may be sorted by relevance to a search query sent to data sources 106. Each result displayed in search results 112 may include a title, a link that points to an actual page on the Web, and a short description showing where character string 122 matched content within data sources 106. Due to the huge number of items that are available or related to searches, there may be an option for user 110 to restrict search results 112 to a limited number. In examples of the present description, each succeeding search result from the top down may have a lower ranking or lower relevancy result. Search results returned from data sources 106 and search results 112 differ in that search results 112 are the product of all the merged search results received from data sources 106 up to the moment they are displayed, sorted for relevance and filtered.

Examples of the present disclosure generally describe a system to merge search results received at computing system 102 from several different data sources 106. Several different search results return to computing system 102 from several different data sources 106. Computing system 102 may aggregate and merge all incoming search results as they arrive at computing system 102 into a sorting algorithm. Search results 112 may be displayed in type down interface 114 showing a combination of results from data sources 106 with search results including address, names, and possible search results from private or proprietary data sources. Examples of the present disclosure may reduce user typing, clicks by users and user training needed. Type down system 100 may also reduce user mistakes by eliminating the need to switch from a localized type down interface to a public type down interface, and make sure business rules regarding searching are correctly enforced thus reducing service failures. Additionally or alternatively, instead of performing the searches, merging, sorting and filtering on a server, all operations are performed on computing system 102 to reduce the load on a server. The computing may be transferred from the servers to computing system 102. The merging, sorting and filtering of two or more data sources may be performed on computing system 102, thus removing any latency in responses while a server processes the search results.

Merging search results received at computing system 102 may involve combining search results from different data sources 106 at computing system 102. Examples of the present disclosure relate to combining into a common search result 112, search results from different data sources 106 as user 110 enters individual characters of a character string 122 into a search box 120. New or refined search results 112 are displayed as user 110 progressively enters more characters of character string 122 into search box 120. The collection of search results from data sources 106 occurs at computing system 102. When computing system 102 receives entry of a character string 122 in search box 120, computing system 102 sends requests to data sources 106 and directly receives results from data sources 106. Computing system 102 may then sort and arrange the search results from various data sources 106 as they arrive at computing system 102. Computing system 102 may continue to update the presented search results 112 as search results arrive from the various data sources 106. Computing system 102 may also apply additional filtering of displayed search results 112 received from data source 106 based on additional characters added to character string 122.

Figure 2:
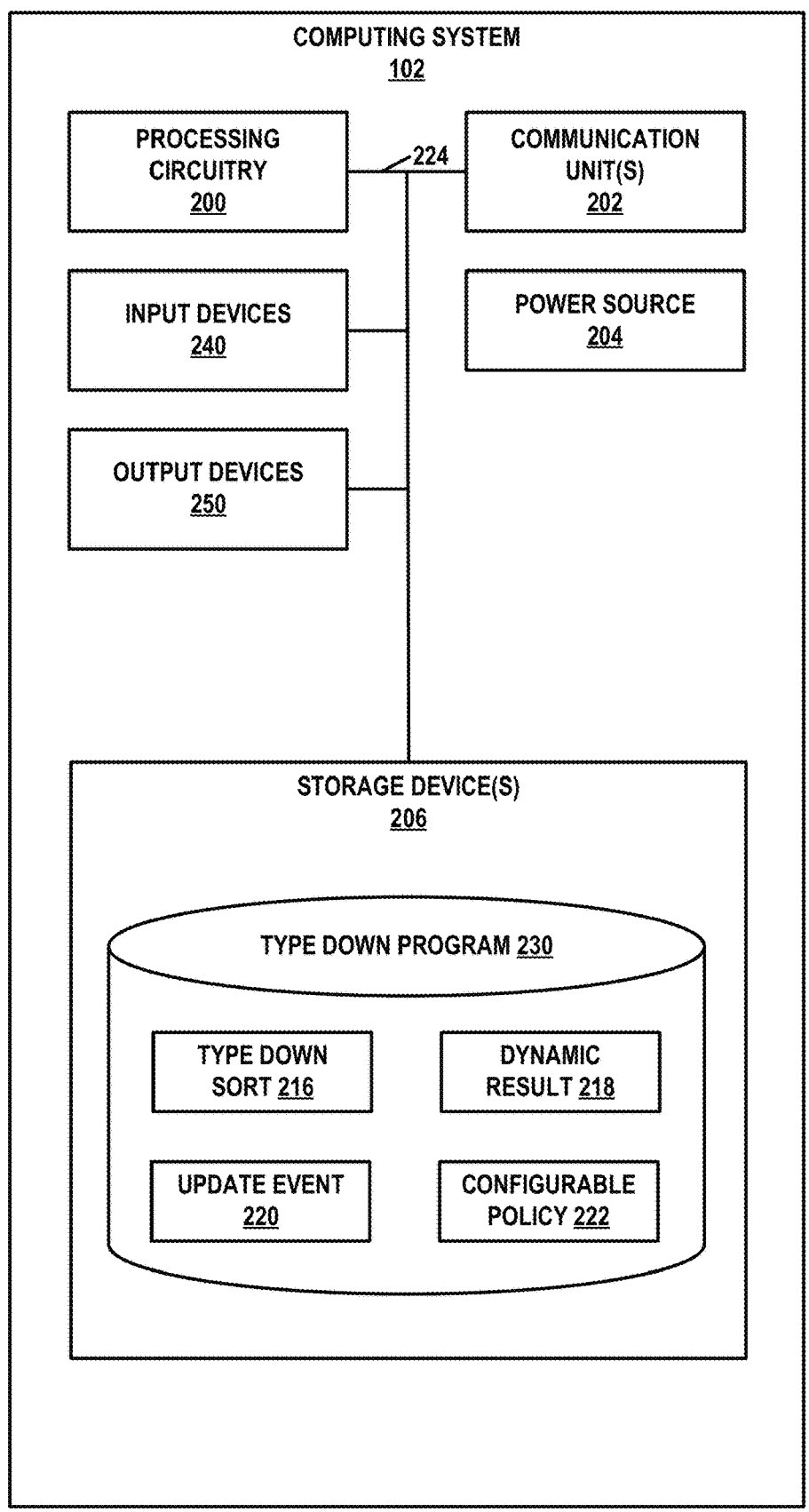
FIG. 2 is a block diagram illustrating example components of a computing system in accordance with one or more aspects of this disclosure.

FIG. 2 is a block diagram illustrating example components of computing system 102 in accordance with one or more aspects of this disclosure. FIG. 2 illustrates only one example of computing system 102, without limitation on many other example configurations of computing system 102.

As shown in the example of FIG. 2, computing system 102 includes one or more processing circuitry 200, one or more communication unit(s) 202, a power source 204, one or more storage device(s) 206, and one or more communication channels 224. Computing system 102 may include other components. For example, computing system 102 may include input devices 240 (e.g., such as a keyboard 116, a mouse, or a touch screen), output devices 250 (e.g., display 118, speakers, etc.), and so on. Communication channel(s)

224 may interconnect each of components 200, 202, 206, 240, and 250 for inter-component communications (physically, communicatively, and/or operatively). In some examples, communication channel(s) 224 may include a system bus, a network connection, an inter-process communication data structure, or any other method for communicating data. Power source 204 may provide electrical energy to components 200, 202, 206, 240, and 250. Storage device(s) 206 may store information required for use during operation of computing system 102.

Processing circuitry 200 may comprise circuitry configured to perform processing functions. For instance, one or more of processing circuitry 200 may be a microprocessor, application-specific integrated circuit (ASIC), field-programmable gate array (FPGA), or other type of processing circuit. In some examples, processing circuitry 200 of computing system 102 may read and may execute instructions stored by storage device(s) 206.

Communication unit(s) 202 may enable computing system 102 to send data to and receive data from one or more other computing devices (e.g., via a communications network, such as a local area network or the Internet). For instance, communication unit(s) 202 may be configured to send search queries, receive search results, and so on. In some examples, communication unit(s) 202 may include wireless transmitters and receivers that enable computing system 102 to communicate wirelessly with other computing devices. Examples of communication unit(s) 202 may include network interface cards, Ethernet cards, optical transceivers, radio frequency transceivers, or other types of devices that are able to send and receive information. Other examples of such communication units may include BLUETOOTH™, 3G, 4G, 5G, and WI-FI™ radios, Universal Serial Bus (USB) interfaces, etc. Computing system 102 may use communication unit(s) 202 to communicate with one or more other computing devices or systems, such as data source 106.

Storage device(s) 206 may store type down program 230. In the example of FIG. 2, type down program 230 may include sub-programs or subroutines such as type down sort 216, type down sort dynamic result set handler 218, output update event handler 220, configurable policy 222, and/or other data. Type down sort 216 may create a user specific session type down sort data structure used to store results from different data sources 106. Type down sort 216 may support multithreaded search results from data sources 106. Type down sort 216 may also support displaying sorted outputs on a display, user interface inputs (e.g., web address links associated with each sorted output), labels and other data sources. Type down sort dynamic result set handler 218 may be a function which handles the responses from data sources 106. Result set handler 318 may have a sort function associated with it and applies a configurable data policy 222 to the data source search results before inserting the results into the type down sort 216. Output update event handler 220 may be a program that receives the updated events from type down sort 216 asynchronously and then may update any output device 250, such as a display (e.g., search results 112). Data source search results refer to the search results returned to computing system 102 one or more data sources. Search results, such as search results 112, refer to the displayed search results presented to the user.

The search results are received asynchronously, meaning they are received at different and varying times. The search results are not held in a buffer until all search results for the search requests are received. Instead, the search results are processed as soon as they come in. The search requests are also not synchronized, meaning they are sent out independent of other search requests and do not require being sent as a group. In another example, the search requests may be synchronized as well as the search results being received, however; for updating search results 112 quickly, receiving the search results asynchronously may allow for quicker updating of the search results.

Configurable policy 222 may filter search results from data sources 106 to eliminate advertisement search results, duplicate search results, limit displayed search results (e.g., only display the top ten search results), filter any search results that may link or connect to prohibited Web addresses and filter any search results linking to addresses known to be associated with malware or viruses. Configurable policy 222 may reduce the size of search results by filtering out duplicate search results received from different data sources 106. This assists in reducing the amount of information retained from the search results and eliminates any duplicate search results being displayed.

Processing circuitry 200 may read instructions from storage device(s) 206 and may execute instructions stored by storage device(s) 206. Execution of the instructions by processing circuitry 200 may configure or cause computing system 102 to provide at least some of the functionality ascribed in this disclosure to computing system 102.

In one example, user 110 may begin typing character string 122 into search box 120 on an input device 240, such as a keyboard 116, that triggers type down program 230. Type down program 230 may asynchronously call out to two or more data sources 106 through communication unit(s) 202 to obtain search results, based on character 122. The search results 112 may then be merged by dynamic result handler 218, as they arrive back from data sources 106 and transferred into a type down sort program 216. Update event program 220 may display sorted search results 112, in real time, updating sorted search results 112 as data source results continue to arrive. The data source search results, number of results and control of duplicate search results may be configurable through configurable data policy 222 that may restrict or limit certain results. In an example of the present description, type down program 230 allows user 110 the ability to combine address search results from a third-party mapping API and a relational database only accessible by user 110 and display one search result set, merged, sorted and filtered in real time. Additionally or alternatively, type down program 230 may also provide network provider names along with API identifiers to allow user 110 the ability to identify where the search results originated from.

Figure 3:
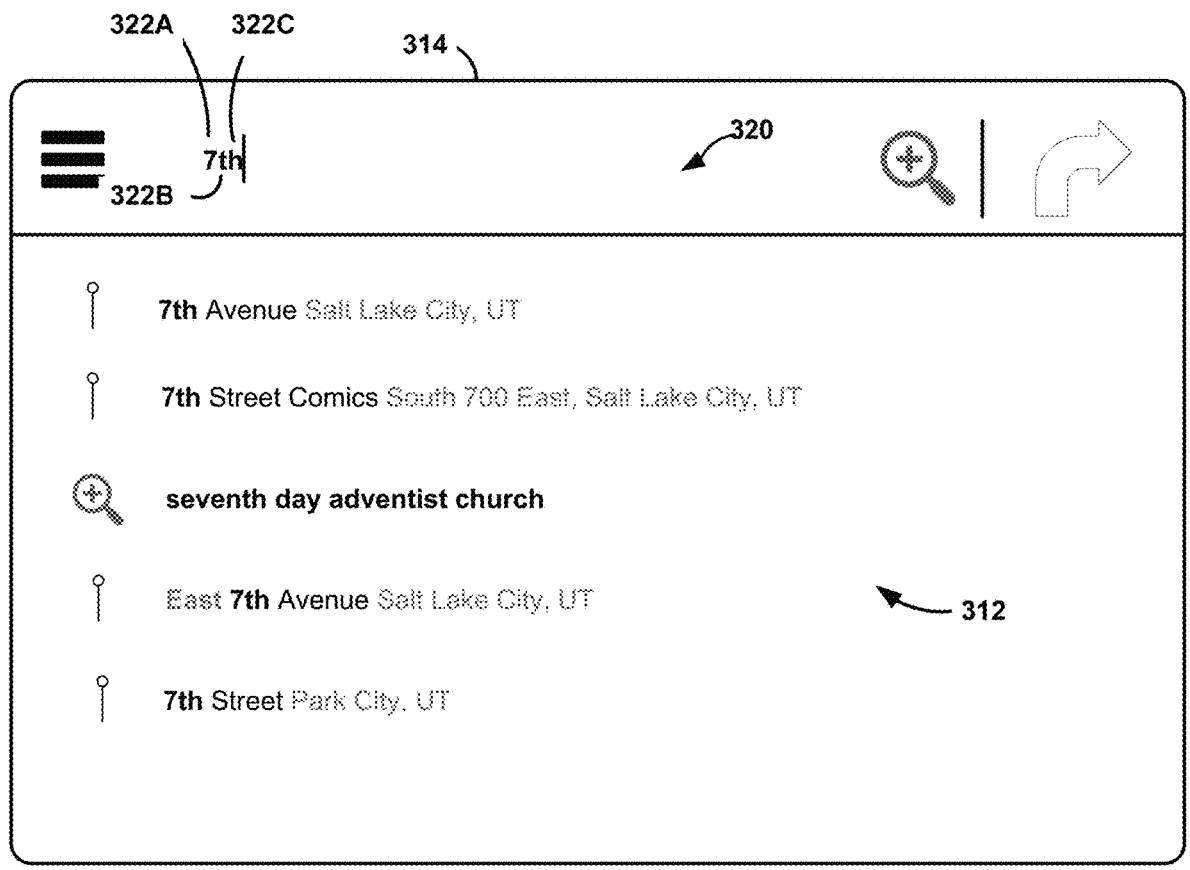
FIG. 3 is a block diagram illustrating an example type down interface and search results in accordance with one or more aspects of this disclosure.

FIG. 3 is a block diagram illustrating an example type down interface 314 and search results 312 in accordance with one or more aspects of this disclosure. In the example of FIG. 3, computing system 102 may perform a type down interface 314 with one or more data sources 106. Processing circuitry 200 may receive character 322A from user 110 for type down interface 314. In response to character 322A, processing circuitry 200 may send multiple asynchronous search requests to one or more data sources 106. Processing circuitry 200 may receive a first set of data source search results from a first data source 106 in response to the asynchronous search requests. Processing circuitry 200 may display search results 312 for user 110. During this time, a second one or more data source search results from a second data source 106 may be received by processing circuitry 200. Based on the received second one or more data source search results, processing circuitry 200 may update and display newly updated search results 312.

Processing circuitry 200 (FIG. 2) may apply additional merging, sorting and filtering of search results received from data sources 106 based on each additional character 322B and 322C as they are inputted by user 110 and update each respective search result 312 from each data source 106 for each additional search results from each additional character 322B and 322C.

Processing circuitry 200 merges or combines multiple sources of search results from data sources 106, then sorts and filters the search results from data sources 106 in real time. For example, if the search request entered into search box 320 up to a point is characters 322A and 322B, "7t," processing circuitry 200 receives characters "7t" from type down interface 314. Processing circuitry 200 may send out asynchronous search requests to data sources 106 for "7t" and, in response, begin to receive search results corresponding to "7t". During the time search results are still arriving from data sources 106, user 110 may have entered character 322C the letter "h". Accordingly, processing circuitry 200 may send a request to data sources 106 for "7th". Processing circuitry 200 may then merge, sort and filter the search results existing for "7t" and search results received for the search query based on character string "7th." Processing circuitry 200 may then update search results 312 for characters 322A and 322B as search results for characters 322A, 322B and 322C (hereinafter referred to as character string 322), "7th" arrive from data sources 106.

As search results arrive asynchronously from data sources 106, processing circuitry 200 may sort the search results with type down sort 216. Processing circuitry 200 may also apply any configurable data policy 222 and search results 312 may be updated after the search results are sorted and filtered through configurable policy 222. Type down sort 216 may provide a sort order and may provide clickable triggered links including a web address or provider name selection. User 110 may view all links, web addresses, and names that are returned from the search results for the inputted character string 322 from third party APIs as well as all search matches from an "in-network" provider in a single typed down search box 320.

In examples of the present disclosure, processing circuitry 200 may continue to update displayed search results 312 as data arrives from various data sources 106. Thus, updating search results 312 in real time as search results are received. For example, processing circuitry 200 may receive search results F, E, D from a first data source 106 based upon a search. After sorting and filtering processing circuitry 200 may display search results 312 as D, E, and F. In this example, after processing circuitry 200 has displayed search results D, E, and F, processing circuitry 200 may receive search results C, A, and B from a second data source 106 for the same search string which produced search results D, E, and F. Thus, in this example, processing circuitry 200, after merging search results D, E, F, C, A, and B, sorting and filtering the search results, may update displayed search results 312 so that the displayed search results include A, B, C, D, E and F.

Type down system 100 may improve the user experience by removing clicks between an "outside" or public search interface and a proprietary search interface. Type down system 100 may also reduce errors by eliminating the need for users to click between third-party search results and in-network provider search results. If the wrong search engine is selected invalid errors may occur. By merging multiple search results, an address selection process may be simplified. User 110 may no longer have to know which search results to choose between search result addresses from private or proprietary data sources 106 and search results from public data sources 106, because all the search results may be presented to user 110. Thus, user errors, caused by user 110 selecting the wrong search interface between a search interface to public data sources and a search interface to a private data source, may be reduced by providing a single search interface.

Further, instead of performing the searches, merging, sorting and filtering on a server, all operations are performed on computing system 102 to reduce the load on a server. The computing may be transferred from the servers to computing system 102. The merging, sorting and filtering of two or more data sources is performed on computing system 102, thus removing any latency for responses from while a server processes the search results. Additionally or alternatively, computing system 102 may display search results 312 much faster than a system that must wait for search results to come back from each of data sources 106 before displaying any results.

Figure 4A:
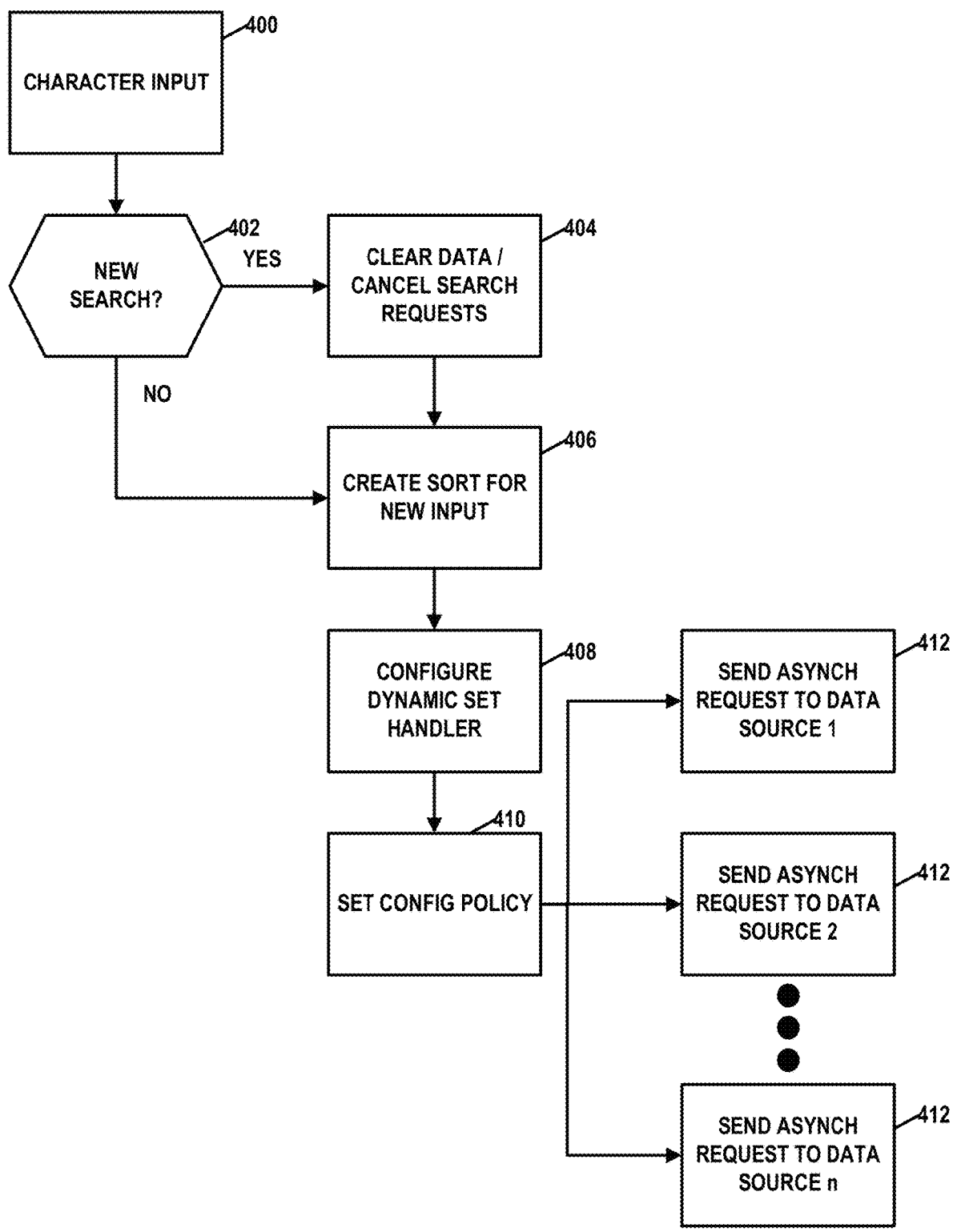
FIGS. 4A & 4B illustrate portions of a flowchart of an example operation performed by a computing system and data sources in accordance with one or more aspects of this disclosure.
Figure 4B:
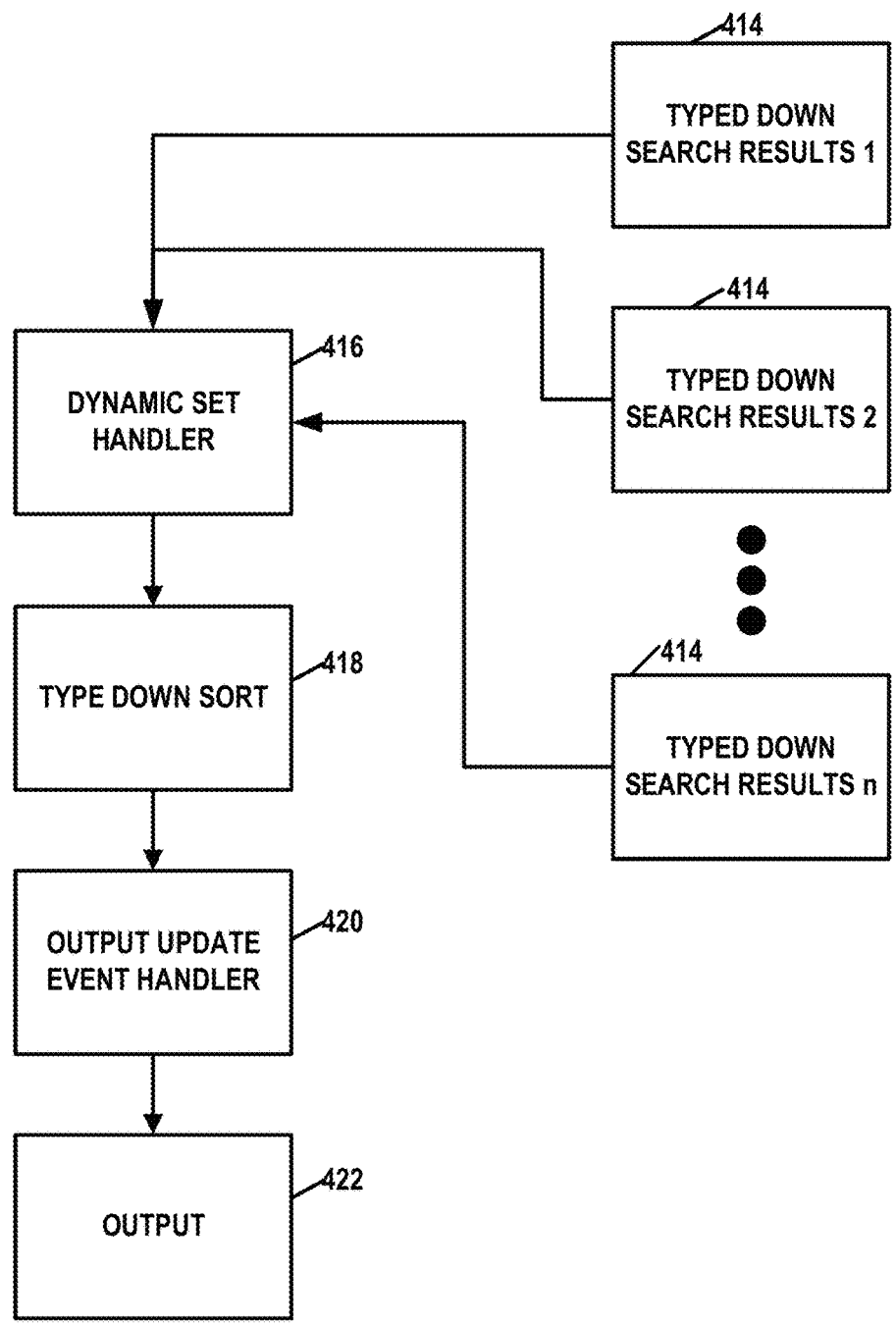

FIGS. 4A & 4B illustrate portions of a flowchart of an example operation performed by computing system 102 and data sources 106 in accordance with one or more aspects of this disclosure. User 110 may input a character or a character string from an input device 240, such as keyboard 116, a voice to text application, etc. (400) into search box 320 of type down interface 314. While discussions up to this point have been based on single character inputs upon which multiple searches are initiated, aspects of the present disclosure may be based on an inputted character string as well. For example, in a speech to text application, often times the user will speak a word and not spell the word out. In this type of example, the first character may be the first character string and the process of FIGS. 4A and 4B may be processed similarly. For example, a first character string would equate to a first character and a second character string a second character and so on.

Upon receiving a character in search box 320, type down program 230 may determine whether this is a new search or the continuation of an already existing search (402). This determination may be based off a single character, the newly inputted character, is within search box 320. If search box 320 has only the newly inputted character, then it may be determined a new search is in progress ("YES" branch of block 402). Typed down program 230 clears any data in a typed down buffer or memory and cancels all data source search requests (404). Thus, processing circuitry 200 zeros the data (e.g., clears any data stored in the buffer) within the typed down buffer. Additionally, any search requests initiated to data sources 106 are canceled (e.g., if there any currently pending). Type down program 230 creates a type down sort buffer that may be a user specific session used to store type down sort results for a specific character or character string (406).

If search box 320 is not empty, then it may be determined a search is already in progress ("NO" branch of block 402) and the inputted character would be combined with any previous characters and a new type down sort buffer may be created (406). After the type down sort structure is created, type down program 230 configures dynamic result set handler 218 to determine how the search results from data sources 106 are sorted (408). The sort may be determined by an administrator, user 110 or the sort may be determined by commonly used practices. A configuration policy may also be set (410). Type down program 230 may ask user 110 how many search results they wish to see, if there any particular data sources to be given preference, etc. The character or character string may then be sent out, asynchronously to each data source (412). Boxes 412 are shown as asynchronous search requests to data sources 1, 2, through n, where n may be a positive whole integer. While search requests may be submitted to any number of data sources, for best results, computer system 102 may send out search requests to all data sources 106. Additionally or alternatively, computer system 102 may select which data sources 106 to submit searches to based on the type of search, user preference or a system administrator's preference.

In FIG. 4B, the typed down search results are returned from data sources 106 (414). As stated above, the search request is sent out asynchronously and the typed down search results will come back at different rates and at varying times. Dynamic result set handler 218 handles the typed down search results from data sources 106 (416). Dynamic result set handler 218 performs an initial sort and apply the configuration data policy to the typed down search results. Type down sort 216 sorts the remaining typed down search results and outputs an update event to the output update event handler (418). Update event 220 receives the updated events from type down sort 216 as type down sort 216 outputs to the update event handler (420). Update event 220 updates displayed search results through an output event (422).

Data sources 106 may output updated search results (422) as a new character is inputted (400). The updating of search results may be continuous as search results arrive from data sources 106 (414). Thus, as user 110 is inputting characters and search results arrive back from data sources 106, search results will continue to be merged with as many data sources as possible, sorted for the best results, filtered and updated for a user 110 all at computer system 102.

Figure 5:
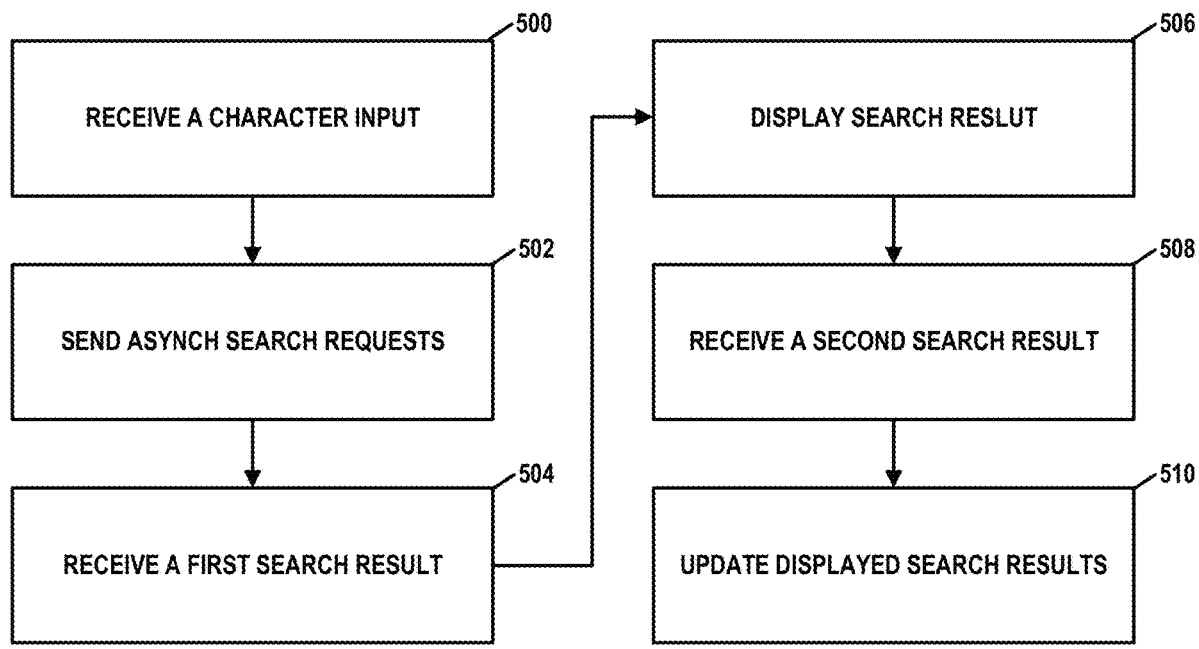
FIG. 5 is a flowchart illustrating an example operation of a type down search in accordance with one or more aspects of this disclosure.

FIG. 5 is a flowchart illustrating an example operation of a type down search in accordance with one or more aspects of this disclosure. In FIG. 5, computing system 102 receives a first character from a character input from user 110 for a type down search (500). As stated above, first character may also be a first character string if speech to text is being used. User 110 may input an initial character into the search box. Additionally or alternatively, type down program 230 may provide a delay where no search is initiated if inputted characters are typed in quickly. For example, similar to text to speech, if user 110 is typing fast, type down program 230 may wait or pause before sending any search requests to data sources 106. Type down program 230 may pause 0.25 seconds after receiving a character and if no new character is received, search requests may be sent to data sources 106 (e.g., send a request with the character string typed in up to the paused 0.25 seconds).

In response to the first single character input, computing system 102 sends a plurality of asynchronous search requests to one or more data sources 106 (502). In another example, the search requests may be synchronous. However, each data source 106 may handle the search request differently and the processing time will be different for each data source 106.

In response to the plurality of asynchronous search requests, computing system 102 receives a first one or more data source search results from a first data source (504). Computing system 102 sorts and filters the one or more data source search results and then displays search results for user 110 (506). The filtering of the search results takes place on computer system 102 and not on a server remote from user 110. Additionally, the filtering may occur continuously as user 110 is inputting additional characters. Thus, search results that may have been relevant for the penultimate character inputted may now become irrelevant once user 110 inputs an additional character. The filtering is being performed continuously and in real time as user 110 is typing in their search.

Computing system 102 may receive a second one or more data source search results from a second data source based on the first character search request (508). Computing system 102 updates the search results by merging the first and second data source search results, sorting, filtering and then displaying the merged data source search results (510).

For processes, apparatuses, and other examples or illustrations described herein, including in any flowcharts or flow diagrams, certain operations, acts, steps, or events included in any of the techniques described herein may be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

In one or more examples, the functions described may be implemented in hardware, software, firmware, or any combination thereof. If implemented in software, the functions may be stored on or transmitted over a computer-readable medium as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that may be accessed by one or more computers or one or more processors to retrieve instructions, code and/or data structures for implementation of the techniques described in this disclosure. A computer program product may include a computer-readable medium.

By way of example, and not limitation, such computer-readable storage media may include RAM, ROM, EEPROM, CD-ROM, or other optical disk storage, magnetic disk storage, or other magnetic storage devices, flash memory, or any other medium that may be used to store desired program code in the form of instructions or data structures and that may be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry, as well as any combination of such components. Accordingly, the term "processor," as used herein, may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

What is claimed is:

1. A method comprising:
   receiving, by a computing system, a first single character input from a user for a type down search;
   responsive to the first single character input, sending, by the computing system, a plurality of asynchronous search requests to one or more data sources;
   responsive to the plurality of asynchronous search requests, receiving, by the computing system, a first one or more data source search results from a first data source;
   displaying, by the computing system, the one or more data source search results;
   receiving, by the computing system, a second one or more data source search results from a second data source different from the first data source;
   updating, by the computing system and based on the received second one or more data source search results, the displayed one or more data source search results;
   receiving, by the computing system, a second single character input from the user for the type down search;
   responsive to the second single character input, sending, by the computing system, a second plurality of asynchronous search requests to the one or more data sources;
   responsive to the second plurality of asynchronous search requests, receiving, by the computing system, a third one or more data source search results; and
   updating, by the computing system and based on the received third one or more data source search results, the displayed one or more data source search results.

2. The method of claim 1, further comprising responsive to receiving the second one or more data source search results, merging, by the computing system, the first and second one or more data source search results.

3. The method of claim 2, further comprising responsive to the first and second one or more data source search results being merged, sorting, by the computing system, the first and the second one or more data source search results.

4. The method of claim 3, wherein sorting the first and the second one or more data source search results comprises sorting the first and the second one or more data source search results by any one or more sorting methodologies including: alphabetic, reverse alphabetic, most common result, or least common result.

5. The method of claim 3, further comprising in response to the sorting of the first and the second one or more data source search results, filtering, by the computing system and based upon all characters inputted and a filter, the first and the second one or more search results from the one or more data sources.

6. The method of claim 5, wherein the filter comprises a configurable data policy that filters the first and the second one or more data source search results by client preferences including: blocked addresses, unvalidated addresses, and addresses unmatched between two or more data source search results.

7. The method of claim 1, further comprising:
   receiving, by the computing system and based on the first one or more asynchronous search requests, a fourth one or more data source search results;
   filtering, by the computing system, the one or more data source search results with priority to the one or more data source search results received from the second plurality of asynchronous search requests to the one or more data sources; and
   updating, by the computing system and based on the received fourth one or more data source search results, the displayed one or more data source search results.

8. The method of claim 7, further comprising linking, by the computing system, a web address correlating to the displayed one or more data source search results.

9. A system comprising:
   a computing system, configured to perform type down searches, the computing system communicatively coupled to one or more data sources, the computing system comprising:
      processing circuitry configured to:
         receive a first single character input from a user for a type down search;
         responsive to the first single character input, send a plurality of asynchronous search requests to the one or more data sources;
         responsive to the plurality of asynchronous search requests, receive a first one or more data source search results from a first data source;
         display the one or more data source search results;
         receive a second one or more data source search results from a second data source different from the first data source;

update, based on the received second one or more data source search results, the displayed one or more data source search results;

receive a second single character input from the user for the type down search;

responsive to the second single character input, send a second plurality of asynchronous search requests to the one or more data sources;

responsive to the second plurality of asynchronous search requests, receive a third one or more data source search results; and update, based on the received third one or more data source search results, the displayed one or more data source search results.

10. The system of claim 9, the processing circuitry further configured to, responsive to receiving the second one or more data source search results, merge the first and second one or more data source search results.

11. The system of claim 10, the processing circuitry further configured to, responsive to the first and second one or more data source search results being merged, sort the first and the second one or more data source search results.

12. The system of claim 11, wherein the processing circuitry is configured to, as part of sorting the first and the second one or more data source search results, sort the first and the second one or more data source search results by any one or more sorting methodologies including: alphabetic, reverse alphabetic, most common result, or least common result.

13. The system of claim 11, the processing circuitry further configured to, responsive to the sort of the first and the second one or more data source search results, filter, based upon all characters inputted and a filter, the first and the second one or more search results from the one or more data sources.

14. The system of claim 13, wherein the filter comprises a configurable data policy that filters the first and the second one or more data source search results by client preferences including: blocked addresses, unvalidated addresses, and addresses unmatched between two or more data source search results.

15. The system of claim 9, the processing circuitry further configured to:

receive, based on the first one or more asynchronous search requests, a fourth one or more data source search results;

filter the one or more data source search results with priority to the one or more data source search results received from the second plurality of asynchronous search requests to the one or more data sources; and update, based on the received fourth one or more data source search results, the displayed one or more data source search results.

16. The system of claim 15, the processing circuitry further configured to link a web address correlating to the displayed one or more data source search results.

17. A non-transitory computer-readable medium comprising instructions that, when executed, cause processing circuitry to:

receive a first single character input from a user for a type down search;

responsive to the first single character input, send a plurality of asynchronous search requests to the one or more data sources;

responsive to the plurality of asynchronous search requests, receive a first one or more data source search results from a first data source;

display the one or more data source search results;

receive a second one or more data source search results from a second data source different from the first data source; and update, based on the received second one or more data source search results, the displayed one or more data source search results;

receive a second single character input from the user for the type down search;

responsive to the second single character input, send a second plurality of asynchronous search requests to the one or more data sources;

responsive to the second plurality of asynchronous search requests, receive a third one or more data source search results; and update, based on the received third one or more data source search results, the displayed one or more data source search results.

\* \* \* \* \*